United States Patent
Peterson et al.

(10) Patent No.: US 11,431,634 B2
(45) Date of Patent: Aug. 30, 2022

(54) CLIENT DEVICE AND RESOURCE MANAGER LOAD SHARING

(71) Applicant: Lenovo (Singapore) Pte. Ltd., New Tech Park (SG)

(72) Inventors: Nathan J. Peterson, Oxford, NC (US); Gary David Cudak, Wake Forest, NC (US); Amy Leigh Rose, Chapel Hill, NC (US); John Scott Crowe, Durham, NC (US); Jennifer Lee-Baron, Morrisville, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 546 days.

(21) Appl. No.: 15/603,847

(22) Filed: May 24, 2017

(65) Prior Publication Data

US 2018/0343201 A1  Nov. 29, 2018

(51) Int. Cl.
| | |
|---|---|
| *H04L 12/803* | (2013.01) |
| *H04L 29/06* | (2006.01) |
| *H04L 29/08* | (2006.01) |
| *H04L 47/125* | (2022.01) |
| *H04L 67/00* | (2022.01) |
| *H04L 67/10* | (2022.01) |
| *H04L 67/02* | (2022.01) |

(52) U.S. Cl.
CPC .......... *H04L 47/125* (2013.01); *H04L 67/10* (2013.01); *H04L 67/34* (2013.01); *H04L 67/02* (2013.01)

(58) Field of Classification Search
CPC ... H04L 47/125; H04L 67/02; H04L 67/1008; H04L 67/1014; H04L 67/42
USPC ........................................................ 709/226
See application file for complete search history.

(56) References Cited

U.S. PATENT DOCUMENTS

| | | | | |
|---|---|---|---|---|
| 7,814,149 | B1 * | 10/2010 | Stringham | G06F 16/1748 709/224 |
| 8,572,163 | B1 * | 10/2013 | Bromley | G06F 16/1748 709/203 |
| 8,984,399 | B2 * | 3/2015 | Tabone | G06F 21/6218 715/256 |
| 9,712,589 | B2 * | 7/2017 | Hiltch | H04L 65/604 |
| 10,193,823 | B2 * | 1/2019 | Walker | H04L 47/76 |
| 2010/0070328 | A1 * | 3/2010 | Motoyama | G06Q 10/06 705/7.15 |
| 2013/0055078 | A1 * | 2/2013 | Berger | G06F 16/248 715/273 |
| 2018/0287980 | A1 * | 10/2018 | Barak | H04L 51/212 |

* cited by examiner

*Primary Examiner* — Esther B. Henderson
*Assistant Examiner* — Nazia Naoreen
(74) *Attorney, Agent, or Firm* — The Small Patent Law Group LLC; Dean D. Small

(57) ABSTRACT

Methods, devices and program products are provided for utilizing one or more processors to receive a request from a client device for a network responsive resource. The network responsive resource includes a substitute scripted component. The methods, devices and program products determine whether to implement load sharing based on utilization information indicative of a load and build the network responsive resource with a client-side scripted component as the substitute scripted component.

20 Claims, 3 Drawing Sheets

CLIENT DEVICE AND RESOURCE MANAGER LOAD SHARING

BACKGROUND

Embodiments herein generally relate to methods and systems to manage load sharing between client devices and resource managers to process network based resources.

As the Internet continues to develop, network resources (e.g., websites, webpages) provide more and more content of interest to users. In addition to traditional still images and text, today network resources include in-line video, photos, dynamic data, and other components to be processed before presentation through a browser on a client device. As the demand for content increases, similarly server utilization rates increases to maintain websites and webpages. Also, demand is typically uneven in that users may have interest in certain types of content only at certain times. For example, during the NCAA basketball tournament, websites that offer tournament brackets may experience significant traffic, particularly right before the first games of the tournament, as users complete their brackets. The level of traffic at such points in time is not otherwise present the rest of the year. Similarly, websites that support fantasy sports leagues may experience significant added traffic shortly before a season starts or individual games. As another example, websites that offer content related to political elections (e.g., polling results) may experience significant traffic the days leading up to the election and on election day.

When a server become overloaded, the corresponding website(s) become less responsive, which leads to customer dissatisfaction. In some instances, a server may "crash" when sufficiently overloaded. One conventional approach to manage server overload has been to add more servers to support the corresponding websites. However, additional servers are expensive and are not always fully utilized.

SUMMARY

In accordance with an embodiment herein, a method is provided comprising utilizing one or more processors to receive a request from a client device for a network responsive resource. The network responsive resource includes a substitute scripted component. The method determines whether to implement load sharing based on utilization information indicative of a load. The method builds the network responsive resource with a client-side scripted component as the substitute scripted component.

Optionally, the method further comprises building the network responsive resource in a non-load sharing implementation by executing a server-side scripted component as the substitute scripted component. The server-side scripted component may represent a PHP scripted component executable by the resource manager. Optionally, the substitute scripted component initially may represent a server-side scripted component, the building including substituting the client-side scripted component for the server-side scripted component. Optionally, the client-side scripted component may represent a Java scripted component executable by a browser at a client device.

Optionally, the utilization information may be indicative of the load experienced by the resource manager. Optionally, the utilization information may be indicative of the load experienced by a client device, the determining including determining to implement the load sharing based on the load experienced by the client device exceeding a device load threshold. Optionally, the method further comprises returning the network responsive resource to a client device; executing, at a browser of the client device, the client-side scripted component; and displaying the responsive resource with the browser of the client device.

In accordance with an embodiment herein, a device is provided comprising: one or more processors and memory storing instructions accessible by the processor. Responsive to execution of the instructions, the one or more processors to receive a request from a client device for a network responsive resource. The network responsive resource includes a substitute scripted component. The one or more processors determine whether to implement load sharing based on utilization information indicative of a load. The one or more processors build the network responsive resource with a client-side scripted component as the substitute scripted component.

Optionally, responsive to execution of the instructions, the one or more processors to build the network responsive resource in a non-load sharing implementation by executing a server-side scripted component as the substitute scripted component. Optionally, the device comprises a server and wherein the server-side scripted component represents a PHP scripted component executed by the server. Optionally, the memory stores the network responsive resource with a server-side scripted component as the substitute scripted component, and wherein, responsive to execution of the instructions, the one or more processors to substitute the client-side scripted component for the server-side scripted component.

Optionally, the utilization information may be indicative of the load experienced by the resource manager. Optionally, the utilization information may be indicative of the load experienced by a client device, and wherein, responsive to execution of the instructions, the one or more processors to implement the load sharing based on the load experienced by the client device exceeding a device load threshold. Optionally, the utilization information may be indicative of loads experienced by a client device and the resource manager, and wherein, responsive to execution of the instructions, the one or more processors to implement the load sharing based on a relation between the loads experienced by the client device and the resource manager and corresponding device and manager load thresholds.

In accordance with an embodiment herein, a computer program product, is provided comprising a non-signal computer readable storage medium comprising computer executable code to perform: receiving a request from a client device for a network responsive resource, the network responsive resource including a substitute scripted component; analyzing utilization information indicative of a load; and determining whether to implement load sharing based on the utilization information in connection with implementing load sharing, building the network responsive resource with a client-side scripted component as the substitute scripted component.

Optionally, the program further comprises building the network responsive resource in a non-load sharing implementation by executing, at the resource manager, a server-side scripted component as the substitute scripted component.

Optionally, the substitute scripted component initially represents a server-side scripted component, the building including substituting the client-side scripted component for the server-side scripted component.

Optionally, the program comprises comparing the utilization information to a threshold and based on the comparing disabling an auto activation component within the network responsive resource. The program may be based on the comparing, adding an activation query to the network responsive resource, the activation query to be presented in a display as an option to allow a user to activate the disabled auto activation component.

DETAILED DESCRIPTION

Figure 1:
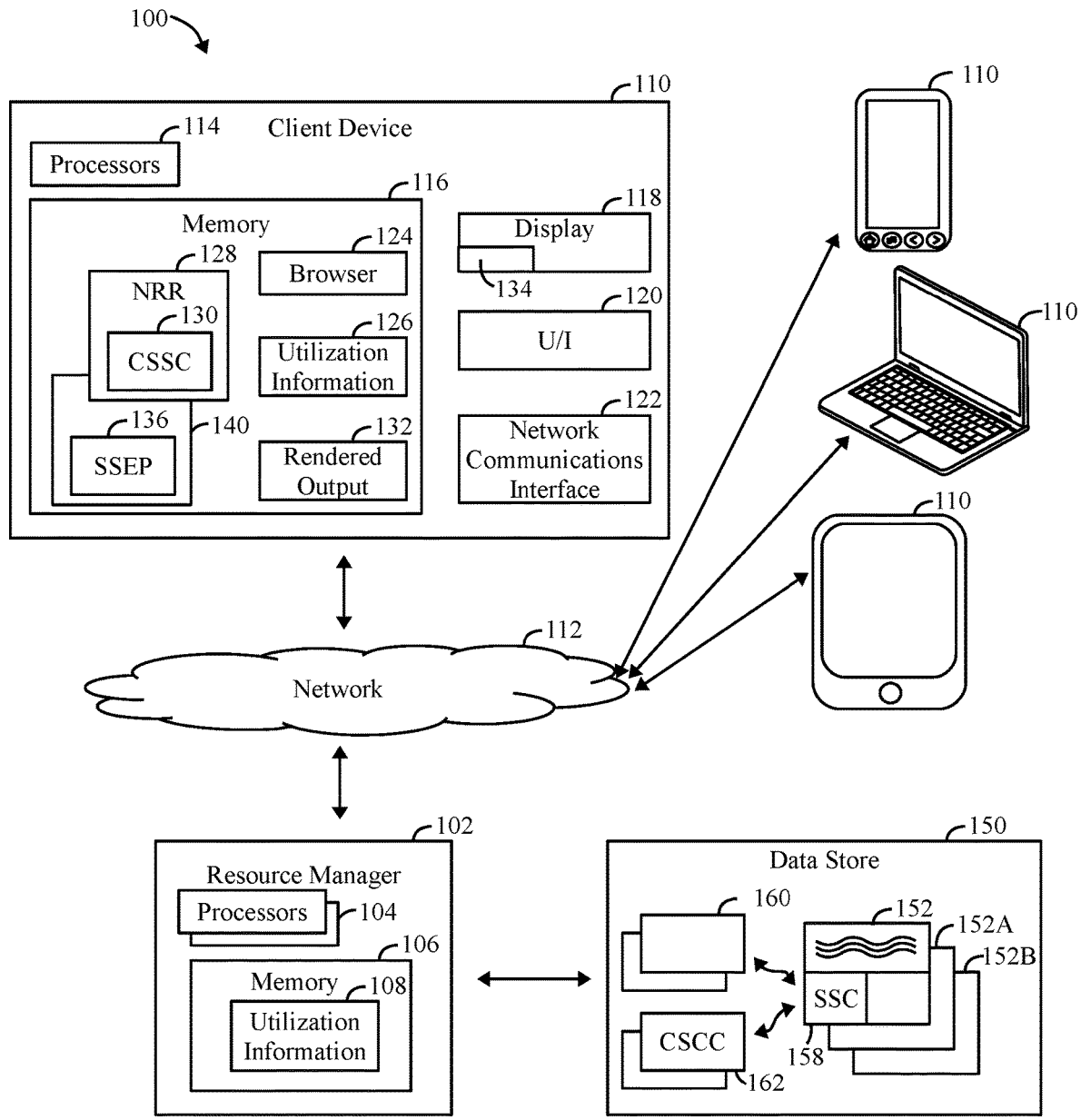
FIG. 1 illustrates a system implemented in accordance with embodiments herein to manage load sharing.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate. The operations of any methods described herein may be performed in parallel, serially or any order unless otherwise specified. One or more of the operations of the methods described herein may be omitted entirely unless otherwise specified.

Terms

The term "utilization information" refers to information characterizing a load experienced by a resource manager and/or client device. Non-limiting examples of utilization information include an amount/level of memory utilization, an amount/level of CPU activity, an amount/level of hard drive utilization, an amount/level of background operations performed by the CPU (e.g., performing an anti-virus scan), a nature of background operations performed by the CPU, etc. Additionally or alternatively, the utilization information may include network load experienced by the client device.

The term "network responsive resource" refers to any network retrievable structure that has identity and is returned by a resource manager in response to a request. Non-limiting examples include a file or document (e.g., webpage) on the World Wide Web, a local area network, or a wide area network. The file or document may include an HTML and/or scripts, graphics, etc. The document is often hyperlinked to other documents on the Web/network. A network responsive resource includes one or more content components that may remain constant or change over time. A network responsive resource can remain constant even when the content components change over time.

A network responsive resource can be dynamic. Network responsive resources may be characterized as abstract responsive resources or information responsive resources. URLs, particularly HTTP URIs, are frequently used to identify abstract resources, such as classes, properties or other kind of concepts. Examples can be found in RDFS or OWL ontologies. URLs are also used to identify information resources.

The term "content component" refers to entities within a document, forming a network responsive resource. Content components may include images, services (e.g., "National Weather Service"), text, video, audio, scripts, a combination thereof and/or links to other resources. The content components are rendered (e.g., assembled) by a browser of a client device for viewing by the user. For example, the content components may include static, finalized content components, such as text, images, etc. that are directly rendered and displayed by the browser. The content components may also include linking components that include a link or address of other content. Content components may also represent script based components, for which one or more scripts are to be executed before a browser can render and display an executed script (e.g., graphics, text, images, video, audio and the like). Content components may also represent auto activated components that begin to play automatically when opened in a browser. In accordance with embodiments herein, script based components may be categorized as server-side scripted components or client-side scripted components.

The term "server-side scripted component" refers to a content component within a network responsive resource that will or has been executed by the server to form a server executed script (SES) end product that is ready to be rendered and displayed through a browser. Server-side scripted components are executed by the server before returning a corresponding network responsive resource to a client device. Non-limiting examples of server-side scripted components, include hypertext preprocessor (PHP) scripts and other server executable scripts that are executable by a server (not a browser) before transfer to the client device. PHP is a server-side scripting language for web development and as a general-purpose programming language. PHP scripts may be embedded into HTML or HTML5 markup, or used in combination with various web template systems, web content management systems and web frameworks. PHP scripts are usually executed by a PHP interpreter implemented as a module in the web server or as a Common Gateway Interface (CGI) executable. The web server software combines the results of the interpreted and executed PHP script, which may be any type of data, including images, with the generated webpage. PHP script may also be executed with a command-line interface (CLI) and can be used to implement standalone graphical applications.

Typically, a browser on a client device cannot directly execute PHP scripts. Instead, the browser would first load a Web server and implement the PHP script through the Web server to generate a server executed script end product which is provided to the browser for presentation.

The term "client-side scripted component" refers to a script component within a network responsive resource that has not been executed by the server before return to a client device, but instead is executed by the browser of the client device. The browser executes the script component to form a client executed script (CES) end product that is then rendered for display through the browser. Non-limiting examples of client-side scripted components include JavaScript and other browser executable scripts. A JavaScript based component may be embedded in a responsive resource, along with non-script based components, as well as server-side scripted components.

The terms "rendering" and "render" refer to certain operations performed by a browser, such as on a client device, when processing a network responsive resource (e.g., webpage) for display. The process for rendering a network responsive resource, at least in connection with scripted components, is performed after server and client-side scripted components are executed to form corresponding server and client executed script end products. One non-limiting example of a process for rendering a network responsive resource is provided hereafter, although it is understood that numerous other rendering processes may be utilized. As one example, when rendering a network responsive resource, a document object model (DOM) is formed from the HTML code within the network responsive resource. Styles are loaded and parsed to form a cascading style sheet (CSS) object module (CSSOM). A rendering tree is created on top of the DOM and CSSOM, where the rendering tree represents a set of objects to be rendered. The rendering tree generally reflects the DOM structure but for invisible elements such as header tags or certain other elements. Text rings are represented in the rendering tree as separate renderers or frames. Each rendering object contains a corresponding DOM object or a text block plus calculated styles, such that the renderer tree describes the visual representation of the DOM. For each rendering tree element, its coordinates are calculated, referred to as a layout. The browser may use a flow method that may utilize one pass to lay out all of the elements, or alternatively multiple passes (e.g., in connection with tables). The browser then implements a painting process to display the resulting information.

The term "browser" refers to an application program that provides a graphical user interface to interact with a network resource manager, such as a server operated in connection with the World Wide Web, a local area network, or a wide area network. The application program is designed to display and/or present audio/video content, based on files or documents received from the network resource manager. The application program may operate on various types of electronic devices, including but not limited to laptop computers, desktop computers, tablet devices, smart phones and the like. Nonlimiting examples of browsers include web browsers that operate as an application program that uses the hypertext transfer protocol (HTTP) to make request of Web servers throughout the Internet on behalf of the user of the browser. Examples of web browsers include Mosaic, Internet Explorer, Firefox, Flock, Safari, Lynx, Chrome and Opera browsers. The term browser also includes social media application programs, such as applications for Facebook, Instagram, Twitter, YouTube, newspapers, etc.

System Overview

FIG. 1 illustrates a system 100 implemented in accordance with embodiments herein to manage load sharing. The system 100 includes one or more resource managers 102 that manage and otherwise provide access to one or more data stores 150 that store network resources 152. The resource manager 102 communicates with client devices 110 through one or more networks 112 to provide access to the network resources 152. The network 112 may represent the World Wide Web, a local area network, a wide area network and the like. The client device 110 may represent various types of electronic devices including, but not limited to, smart phones, desktop or laptop computers, tablet devices, smart TVs, and the like. The resource manager 102 may represent a server or other network based computing environment. The resource manager 102 may represent a single computer system or a collection of computer systems located at a common location or geographically distributed.

The resource manager 102 includes one or more processors 104 and memory 106, among other structures that support operation of the resource manager 102. The memory 106 includes an operating system, instructions to manage the data store 150 and instructions to implement the methods described herein. The memory 106 also stores utilization information 108 related to a load experienced by the resource manager 102 and/or client devices 110. In accordance with embodiments herein, the resource manager 102 receives requests from various client devices 110 and returns network responsive resources 152 in connection there with. It is recognized that the resource manager 102 performs other operations, not described herein, such as operations associated with maintaining resources and the like. Related to embodiments herein, the resource manager 102 monitors the load experienced at the resource manager 102 and/or at client devices 110 and determines whether load sharing is appropriate. Based on the determination of whether or not to load share, the resource manager 102 builds a network responsive resource 152, to be returned to an individual client device 110. As explained herein, a network responsive resource 152 is built with different types of scripts and with auto activation components disabled, based on the decision of whether to load share or not to load share.

For example, when low demand (e.g., low utilization) is experienced by the resource manager 102 and/or high demand is experienced by the requesting client device 110, the resource manager 102 builds a network responsive resource 152 with server-side scripted components (e.g., PHP scripts), and executes the server-side scripted components before returning the network responsive resource 152. Alternatively, when high demand is experienced by the resource manager 102 and/or low demand is experienced by the requesting client device 110, the network responsive resource 152 is built with client-side scripted components (e.g., JavaScript) and returned to the client device 110. The client device 110 then executes the client-side scripted components. Similarly, auto activation components may be disabled based on client device 110 demand (utilization).

In one embodiment, the resource manager 102 monitors internal workload of the processors 104, memory usage and other internal resources. The resource manager 102 switches between server-side and client-side scripted components based on the utilization information 108 experienced at the resource manager 102. The utilization information 108 may be indicative of the present load experienced at the resource manager 102. Additionally or alternatively, the utilization information 108 may represent a prediction or expectation of future load that will occur at some point in the future while the client device 110 still engages the resource manager 102 for additional resources. For example, the processors 104 may track traffic patterns experienced by the resource manager 102 and determine that at certain times of day, certain days of the week and the like, traffic increases to relatively heavy levels. When the processors 104 expect heavy traffic during one of these high traffic time periods, the resource manager 102 may implement load sharing, even though the instantaneous load at the resource manager 102 is relatively low.

In some embodiments, the server switches between server based and client based processing based on the utilization of the client. For example, the resource manager 102 may receive the utilization information, from a client device 110, along with or contemporaneously with a request for a resource. For example, the client device 110 sends a HTTP request, which include data concerning the client device 110 (IP address, type of browser, browser version, mobile/desktop device). At the same time or contemporaneously there with, the client device 110 may also send utilization information concerning the current load experienced by the client device 110 and/or a prediction of a load to be experienced in a near future. The resource manager 102 determines load sharing based on the client device utilization.

Client device utilization is separate and distinct from form factor information. For example, the resource manager 102 may return the network responsive resource 152 in different form-factors based on whether client is mobile or desktop. A change in form factor, based on whether the client device is a mobile or a desktop, represents an operation unrelated to load sharing. A change in form factor does not relate to changing or executing scripted components or disabling auto activation components within a resource. A change in form factor represents an operation by the resource manager 102 that is separate from and/or in addition to switching between server and client-side scripted components.

In some embodiments, the resource manager 102 may switch between server-side and client-side scripted components based on the loads presently experienced by or expected in the near future for both of the resource manager 102 and the client device 110. As one example, a server, implemented as a resource manager 102, may analyze a server-side utilization rate and client-side utilization rate. Also, the server may not return only server-side scripted components or only client-side scripted components. Instead, a network responsive resource may include both as substitute scripted components. For example, the server may determine a first portion of substitute scripted components to be implemented as server-side scripted components and a second portion of the substitute scripted components to be implemented as client-side scripted components.

The data store 150 may store the network resources 152 organized in various manners and related to a wide variety of topics and content. As non-limiting examples, collections of network resources 152 may be organized and maintained in connection with websites, webpages, blogs, social media and the like. The network resources 152 may be organized and maintained within any manner of data sources, such as data bases, text files, data structures, libraries, relational files, flat files and the like.

The network resources 152 include various types of components corresponding to different types of content. In connection with embodiments herein, the network resources 152 include one or more substitute script components 158 that may be executed, replaced or passed through without modification in connection with responding to individual requests based on load sharing determinations and utilization information. As explained herein, the substitute script components 158 may represent server-side scripted components or client-side scripted components.

In one implementation, the network responsive resource 152 may be stored with a server-side scripted component in the location of the substitute script component 158. When the substitute scripted component 158 represents a server-side scripted component, and the resource manager 102 determines that load sharing is desirable, the substitute scripted component 158 is replaced with a corresponding client-side scripted component 162. For example, a link may be included with the substitute scripted component 158, where the link identifies a corresponding client-side scripted component 162. For example, when the substitute scripted component represents a PHP script, the resource manager 102 may replace the PHP script with a corresponding JavaScript before responding.

Alternatively, the network responsive resource 152 may include links, at the location of the substitute scripted component 158, where the links couple to both of a server-side scripted component 160 and a corresponding client-side scripted component 162. When building the network responsive resource 152 in connection with an individual request, the resource manager 102 either i) inserts and returns the client-side scripted component 162 or ii) inserts and executes the server-side scripted component 160 and returns a SES end product.

Optionally, the data store 150 may store parallel sets of network responsive resources 152, where a first set (152A) includes server-side scripted components (PHP scripts) while a second set (152B) includes client-side scripted components (JavaScripts).

The client device 110 include one or more processors 114, memory 116, a display 118, a user interface 120, a network communications interface 122, and various other mechanical components, electrical circuits, hardware and software to support operation of the client device 110. The memory 116 includes an operating system and instructions to implement the processes described herein. The memory 116 also stores one or more application programs to implement a browser 124, as well as other software, information and data as described herein. For example, the memory 116 may maintain utilization information 126 related to the load experienced by the client device 110. The processors 114 may update the utilization information 126 periodically based on load changes.

The browser 124 generated and sends a request in connection with a browser session by a user. The client device 110 receives a network responsive resource 128 in connection with the request. For example, the request may represent an address to a webpage, a link selected by the user, the act of opening a Facebook application, logging into an airline, hotel, bank, rental car application or website, and the like. The browser 124 parses the network responsive resource 128 to determine, among other things, whether client-side scripted components 130 are provided therein. The browser 124 executes it's any client-side scripted components 130 and processes the remainder of the network responsive resource 128 to form a rendered output 132. As explained herein, the client device 110 may receive network responsive resources 140 that include one or more server executed scripts and products 136. The browser 124 converts the network responsive resource 140 to a rendered output 132 without any intermediate execution of a script in connection with the server executed scripted and product 136. The rendered output 132 is loaded/painted into a display buffer in connection with displaying content on the display 118.

Figure 2:
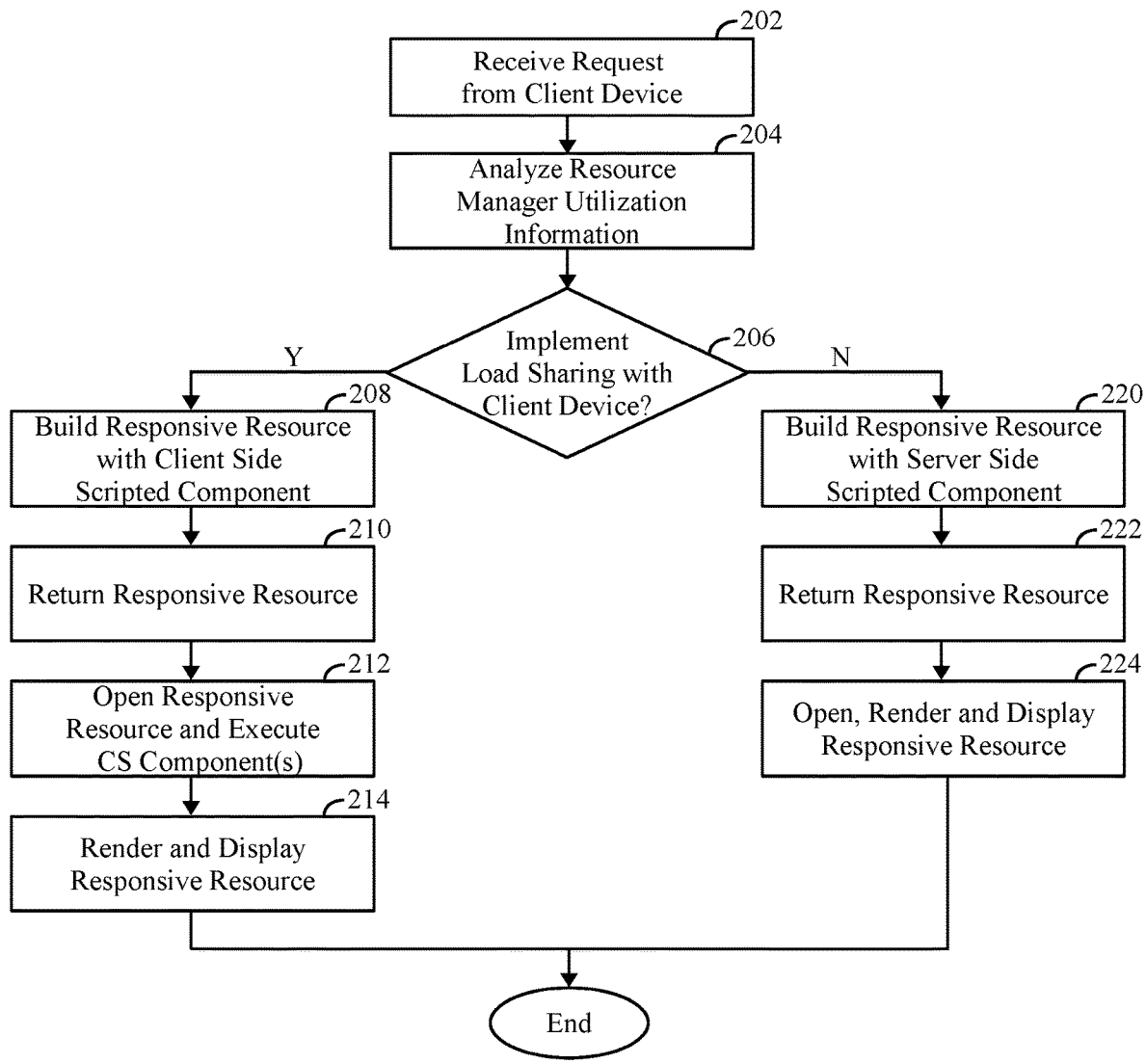
FIG. 2 illustrates a process for managing load sharing in accordance with embodiments herein.

FIG. 2 illustrates a process for managing load sharing in accordance with embodiments herein. The operations of FIG. 2 may be implemented by processors, hardware and circuits within the systems described in the various embodiments herein. The operations of FIG. 2 may be performed continuously or periodically. For simplicity purposes, the operations of FIG. 2, will be described in connection with one request, however it is recognized that a client device 110 may provide multiple requests in connection displaying one resource (e.g., webpage). Optionally, the operations of FIG. 2 may be performed upon select requests from a client device 110, upon every request from a client device 110, upon groups of requests from a client device 110 or otherwise. Optionally, the operations of FIG. 2 may be performed in parallel for multiple client devices 110 on one or more resource managers 102.

At 202, one or more processors of the resource manager 102 receive a request from a client device 110. The request may be provided in connection with various types of operations and from various types of client devices 110. For example, a client device 110 (e.g., a smart phone, personal computer and the like) may operate a browser, through which a user seeks to obtain content from a website or other network resource. As one example, the request may represent a request from a browser for a new webpage. As another example, a browser on the client device 110 may have already received a webpage as a network responsive resource, but the webpage includes one or more linking components. To complete presentation of the initial webpage, the browser may need to convey additional requests in connection with the linking components to obtain additional network responsive resources, which may represent an image, video, audio or other content to be presented within or in connection with the original webpage accessed.

At 204, the one or more processors of the resource manager 102 analyze utilization information related to the resource manager 102. At 206, the one or more processors of the resource manager 102 determine whether to implement load sharing with the client device 110. The determination at 206 is based, at least in part, on the utilization information for the resource manager 102, such as a comparison between the utilization information and one or more thresholds. As one example, the resource manager 102 may determine that CPU usage at the resource manager 102 is above a threshold (e.g., 50% usage). Various examples of utilization information are provided herein, each of which may have a corresponding threshold. Additionally or alternatively, the resource manager 102 may analyze multiple types of utilization information relative to corresponding thresholds and apply a weighted combination that is used to determine whether to implement load sharing. For example, the same or different weights may be applied to relations between CPU usage and a CPA usage threshold, memory usage and a memory usage threshold, and the like. When the resource manager 102 determines to implement load sharing, flow branches to 208. When the resource manager 102 determines not to implement load sharing, flow branches to 220.

At 208, the resource manager 102 builds a network responsive resource that includes one or more client-side scripting components. Optionally, the network responsive resource may include client-side scripted components alone, or in combination with other types of components. For example, the network responsive resource may include text, images, video and the like in addition to one or more client-side scripted components. As another example, the network responsive resource may include one or more server-side scripted components along with one or more client-side scripted components.

Optionally, it may be desirable to include both client-side and server-side scripted components in a common responsive resource. For example, the resource manager 102 may determine an amount or degree of client-side scripted components to include based on the utilization information. For example, when a network responsive resource includes four separate scripted components, the resource manager 102 may determine to implement two of the four scripted components as server-side scripted components and two of the four script components as client-side scripted components when the utilization information indicates that a 50/50 split in load sharing is warranted. As another example, the network responsive resource may include one or more server-side scripted components that impose very little load burden on the resource manager 102, while including one or more client-side scripted components that would otherwise impose a relatively larger load burden on the resource manager 102 if implemented at the resource manager 102.

At 210, the resource manager 102 returns a network responsive resource to the client device 110. At 212, the client device 110 opens the network responsive resource and executes the client scripted component or components. At 214, the client device 110 renders and displays the network responsive resource.

Returning to 206, when it is determined to not implement load sharing, flow branches to 220. At 220, the resource manager 102 builds a responsive resource that includes one or more server-side scripted components to form a network responsive resource. At 222, the resource manager 102 returns the network responsive resource to the client device 110. At 224, the client device 110 opens, renders and displays the network responsive resource without an intermediate step of executing scripted components.

By way of example, the substitute scripted component may represent a table that includes information that may vary. Based on load sharing determinations, the substitute scripted component is formed and populated by either PHP script or JavaScript. The corresponding one of the PHP script and JavaScript will dynamically generate the table. For example, the network responsive resource may relate to political polling information for various local, state and federal elections. The table is dynamic as the size and nature of the columns and rows within the table will vary depending upon the request from the client device 110. For example, a request for polling information may be for a State Senate or the U.S. Senate. Alternatively, the request may be for polling information for a state house of representatives or the US House of Representatives. The PHP script of JavaScript component, when performed, will generate the table with the appropriate number of rows and columns based upon the type of polling information requested. The resource manager 102 executes the PHP script component to look up the appropriate polling information and builds an HTML-based table including the requested polling information. The client device 110 executes the JavaScript component to look up the appropriate polling information and builds an HTML-based table including the requested polling information.

Figure 3:
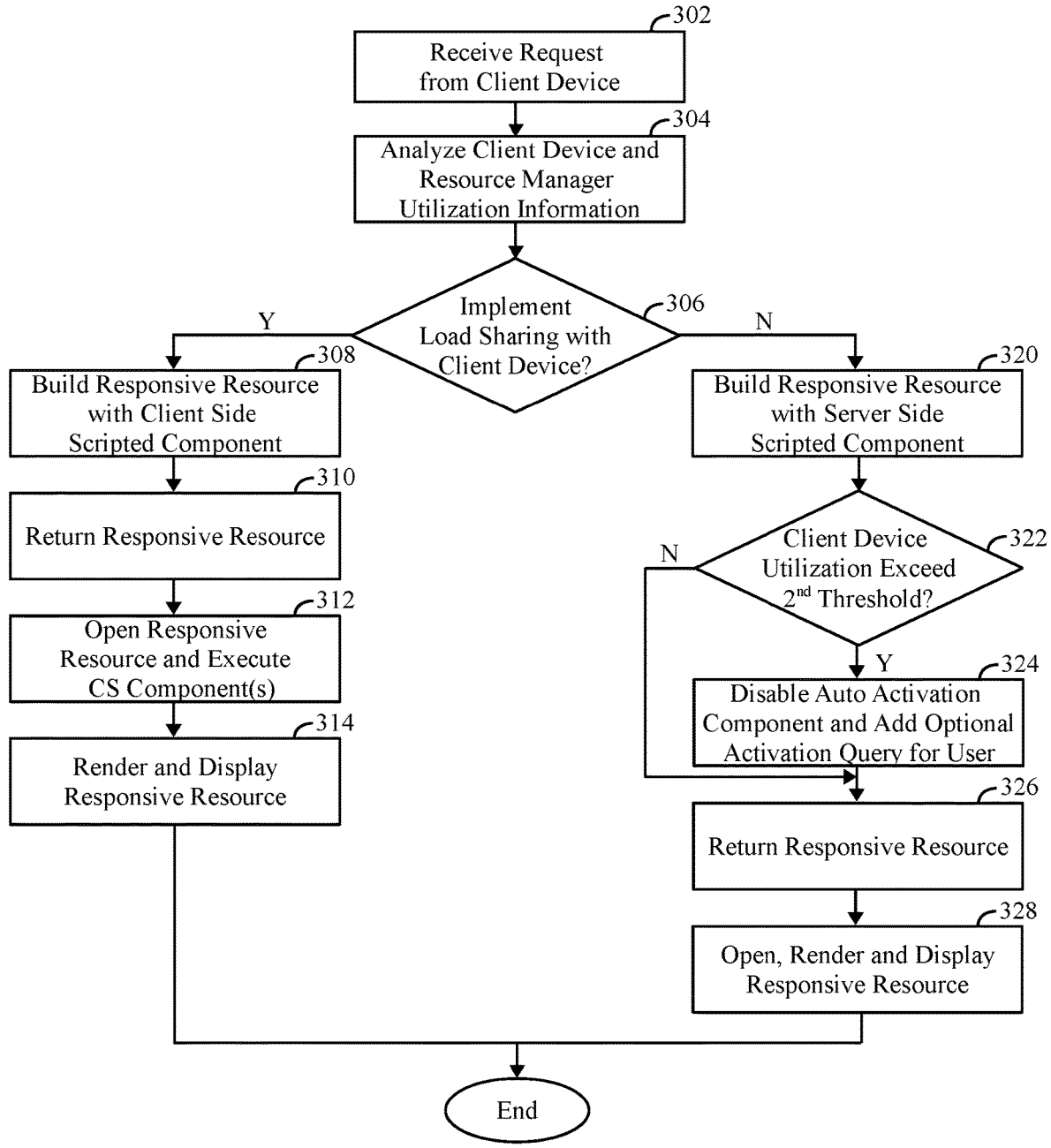
FIG. 3 illustrates a process for managing network-based content delivery in accordance with embodiments herein.

FIG. 3 illustrates a process for managing network-based content delivery in accordance with embodiments herein. At 302, one or more processors of the resource manager 102 receive a request from a client a device. The resource manager 102 also receives client utilization information related to a current operational status of the client.

At 304, the one or more processors of the resource manager 102 analyze the client utilization information. Optionally, the resource manager 102 may also analyze utilization information related to the client manager. As one example, the resource manager 102 may always consider both client and resource manager utilization information. Alternatively, the resource manager 102 may first consider the client utilization information and based thereon, determine whether to additionally analyze resource manager 102 utilization information. For example, when the client utilization information indicates that the client CPU, memory and/or other factors have a low utilization rate, the resource manager 102 may not additionally factor in the utilization at the resource manager 102. Alternatively, the resource manager 102 may first consider the resource manager 102 utilization information and based thereon, determine whether to additionally consider the client utilization information.

At 306, the one or more processors of the resource manager 102 determine whether to implement load sharing with the client device 110. The determination at 306 is based, at least in part, on one or both of client and/or resource manager 102 utilization information. For example, the client and/or resource manager 102 utilization information may be compared to one or more corresponding thresholds. The resource manager 102 may determine that CPU usage at the client device 110 is above a threshold (e.g., 80% usage), and based thereon not implement load sharing. As another example, the resource manager 102 may determine to implement load sharing when the CPU usage at the client device 110 is below a threshold (e.g., 40% usage). Various examples of utilization information are provided herein, each of which may have a corresponding threshold.

Additionally or alternatively, the resource manager 102 may analyze multiple types of utilization information, from the client device 110 and resource manager 102, relative to corresponding thresholds. For example, when a usage percentage at the client device 110 is below a client threshold and the usage percentage at the resource manager 102 is above a manager threshold, it may be determined to implement load sharing. Additionally or alternatively, various types of utilization information may be combined as a weighted sum or in another manner to determine whether to implement load sharing. For example, the same or different weights may be applied to relations between CPU usage and a CPA usage threshold, memory usage and a memory usage threshold, and the like. When the resource manager 102 determines to implement load sharing, flow branches to 308. When the resource manager 102 determines not to implement load sharing, flow branches to 320.

At 308, the resource manager 102 builds a responsive resource that includes one or more client-side scripting components to form a network responsive resource. At 310, the resource manager 102 returns the network responsive resource to the client device 110. At 312, the client device 110 opens the network responsive resource and executes the client-scripted component or components. At 314, the client device 110 renders and displays the network responsive resource.

Returning to 306, when it is determined to not implement load sharing, flow branches to 320. At 320, the resource manager 102 builds a network responsive resource that includes one or more server-side scripted components to form a network responsive resource. At 322, the resource manager 102 determines whether the utilization information for the client device 110 indicates that the client device 110 utilization is exceeding a second (e.g., upper) threshold. For example, the resource manager 102 may determine that the client device 110 is heavily overloaded, to an extent that additional changes are warranted in the network responsive resource to further reduce the burden on the client device 110. When the determination at 322 indicates that the client device 110 utilization exceeds the second threshold, flow passes to 324. Alternatively, when the determination at 322 indicates that the client device 110 utilization has not exceeded the second threshold, flow skips to 326.

At 324, the resource manager 102 disables auto activation components within the network responsive resource. In addition, the resource manager 102 adds an optional activation query to the network responsive resource. The activation query will be presented in the display as an option to allow the user to activate the disabled component. By way of example, the auto activation component may represent to automatic play a video or other load intensive content when a webpage is loaded. For example, in connection with viewing a Facebook account, when a Facebook resource is presented, in some instances, video may begin to automatically play. The video that is automatically played represents an example of an auto activation component. In accordance with embodiments herein, when the utilization at the client device 110 is high, the resource manager 102 disables the automatic activation of the video within the Facebook content and adds an activation query. The user is presented with the activation query to afford the user the option to view the video or not view the video.

Automatic play of video through a Facebook resource is only one example. Additional types of automatic activation exist. As another example, the automatic activation component may correspond to a flash content that would otherwise be automatically played. In accordance with the operations at 322 and 324, the resource manager 102 disables the flash content and instead presents an activation query to the user to allow the user the option to enable the flash content.

At 326, the resource manager 102 returns the network responsive resource to the client device 110. At 328, the client device 110 opens, renders and displays the network responsive resource without an intermediate step of executing scripted components.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "processor", "circuit," "module" or "system." Furthermore, aspects may take the form of a computer (device) program product embodied in one or more computer (device) readable storage medium(s) having computer (device) readable program code embodied thereon.

The memory and a data store may represent any combination of one or more non-signal computer (device) readable medium(s). The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

The instructions may represent program code for carrying out operations that may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. The applications herein may execute a set of instructions that are stored in one or more storage elements, in order to process data. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
utilizing one or more processors, at a resource manager, to perform the following:
receiving, at the resource manager, a request from a client device for a network responsive resource, the network responsive resource including a substitute scripted component initially associated with one or more of a client-side scripted component and a server-side scripted component;
determining whether to implement load sharing based on utilization information indicative of a load experienced by the client device;
implementing the load sharing based on the load experienced by the client device exceeding a first device load threshold, including substituting the client-side scripted component for the server-side scripted component; and
disabling auto activation components within the network responsive resource based on the load experienced by the client device exceeding a second device load threshold.

2. The method of claim 1, further comprising building, at the resource manager, the network responsive resource in a non-load sharing implementation by executing the server-side scripted component as the substitute scripted component.

3. The method of claim 2, wherein the server-side scripted component represents a PHP scripted component executable by the resource manager.

4. The method of claim 1, wherein the substitute scripted component initially represents the server-side scripted component, the building including substituting the client-side scripted component for the server-side scripted component.

5. The method of claim 1, wherein the client-side scripted component represents a Java scripted component executable by a browser at a client device.

6. The method of claim 1, wherein the utilization information is also indicative of the load experienced by the resource manager.

7. The method of claim 1, further comprising returning the network responsive resource to the client device; executing, at a browser of the client device, the client-side scripted component; and displaying the responsive resource with the browser of the client device.

8. The method of claim 1, wherein the network responsive resource includes links at a location of the substitute scripted component, wherein the links couple to both of the server-side scripted component and the client-side scripted component, and wherein the substituting comprises inserting and returning the client-side scripted component in the network responsive resource.

9. The method of claim 1, further comprising determining an amount of client-side scripted components to include in the network responsive resource based on the utilization information.

10. The method of claim 9, wherein the after implementing load sharing, the network responsive resource includes the client-side scripted component and other server-side scripted components.

11. A device, comprising:
one or more processors at a resource manager;
memory storing instructions accessible by the one or more processors;
wherein, responsive to execution of the instructions, the one or more processors to:
receive, at the resource manager, a request from a client device for a network responsive resource, the network responsive resource including a substitute scripted component initially associated with one or more of a client-side scripted component and a server-side scripted component;
determine whether to implement load sharing based on utilization information indicative of a load experienced by the client device;
implement the load sharing based on the load experienced by the client device exceeding a first device load threshold, including substituting the client-side scripted component for the server-side scripted component; and
disable auto activation components within the network responsive resource based on the load experienced by the client device exceeding a second device load threshold.

12. The device of claim 11, wherein, responsive to execution of the instructions, the one or more processors to build the network responsive resource in a non-load sharing implementation by executing the server-side scripted component as the substitute scripted component.

13. The device of claim 11, wherein the device comprises a server and wherein the server-side scripted component represents a PHP scripted component executed by the server.

14. The device of claim 11, wherein the memory stores the network responsive resource with the server-side scripted component as the substitute scripted component, and wherein, responsive to execution of the instructions, the one or more processors to substitute the client-side scripted component for the server-side scripted component.

15. The device of claim 11, wherein the utilization information is also indicative of the load experienced by the resource manager.

16. The device of claim 15, wherein, responsive to execution of the instructions, the one or more processors to implement the load sharing based on a relation between the loads experienced by the client device and the resource manager and corresponding client device and resource manager load thresholds.

17. A computer program product comprising a non-transitory computer readable storage medium comprising computer executable code to perform:
receiving, at a resource manager, a request from a client device for a network responsive resource, the network responsive resource including a substitute scripted component initially associated with one or more of a client-side scripted component and a server-side scripted component;
determining whether to implement load sharing based on utilization information indicative of a load experienced by the client device;
implementing the load sharing based on the load experienced by the client device exceeding a first device load threshold, including substituting the client-side scripted component for the server-side scripted component; and
disabling auto activation components within the network responsive resource based on the load experienced by the client device exceeding a second device load threshold.

18. The computer program product of claim 17, further comprising building, at the resource manager, the network responsive resource in a non-load sharing implementation by executing the server-side scripted component as the substitute scripted component.

19. The computer program product of claim 17, wherein the substitute scripted component initially represents the server-side scripted component, the building including substituting the client-side scripted component for the server-side scripted component.

20. The computer program product of claim 17, further comprising, adding an activation query to the network responsive resource, the activation query to be presented in a display as an option to allow a user to activate the disabled auto activation component.

* * * * *